2,570,482

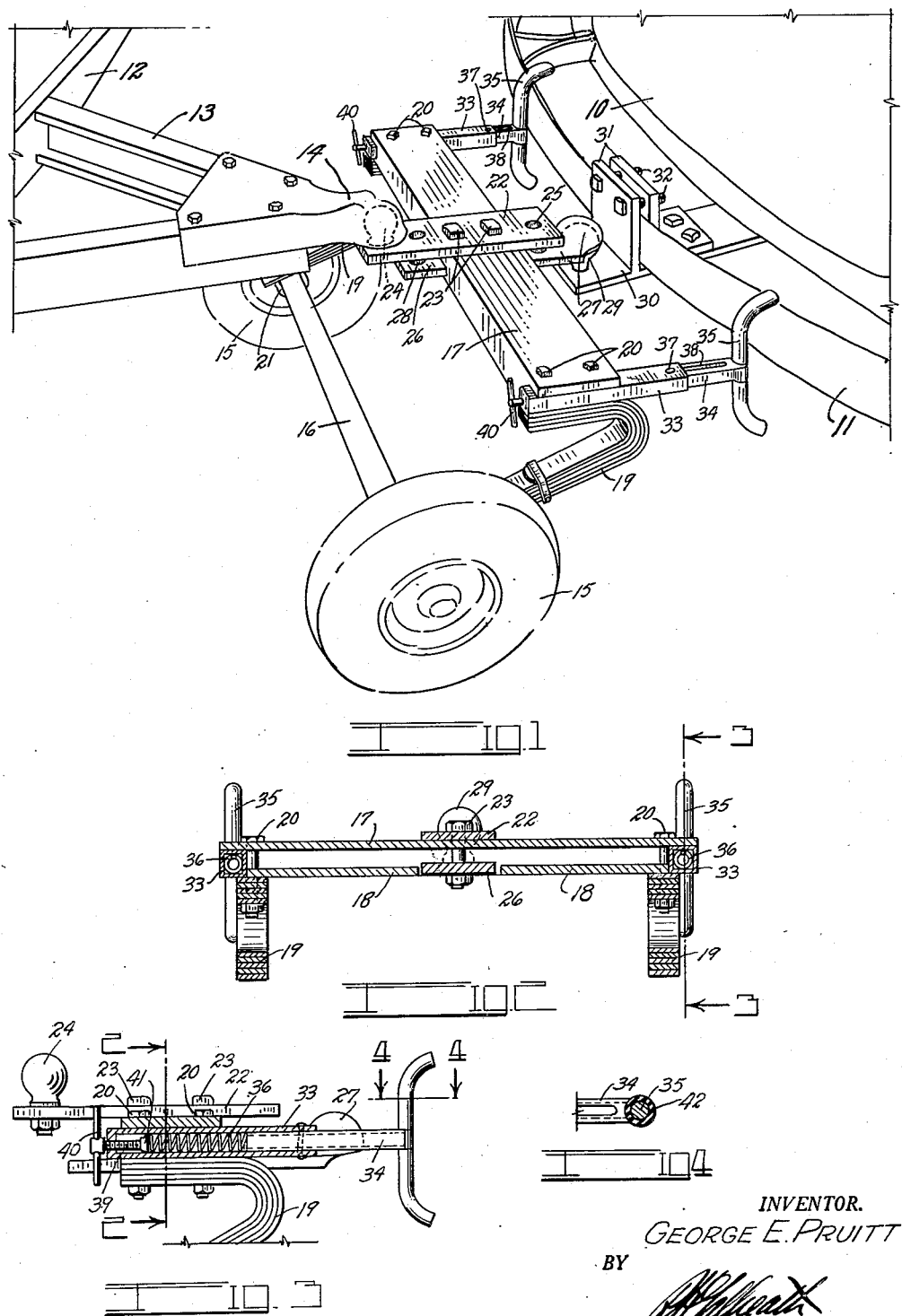
Oct. 9, 1951 — G. E. PRUITT — 2,570,482
FRONT WHEEL DOLLY FOR TRAILERS
Filed June 30, 1949
INVENTOR.
GEORGE E. PRUITT
BY
ATTORNEY Patented Oct. 9, 1951

UNITED STATES PATENT OFFICE 2,570,482

FRONT WHEEL DOLLY FOR TRAILERS

George E. Pruitt, Arvada, Colo.

Application June 30, 1949, Serial No. 102,397

1 Claim. (Cl. 280—33.4)

This invention relates to a trailer dolly, and has for its principal object the provision of a simple, economical, light-weight, and highly efficient dolly for use in supporting the weight of a trailer tongue connection so as to remove the weight from the tow car, and to provide an efficient connection between the tow car and the trailer.

Another object of the invention is to provide a trailer dolly which will resiliently cooperate with the rear bumper of the tow car to prevent sidesway of the dolly and to allow free turning movement thereof when rounding curves, etc.

A further object is to provide a trailer dolly which can be adjusted to vary the position of either or both the tow car connection and the trailer connection so as to obtain the best possible weight distribution and towing relation therebetween.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of the improved trailer dolly, illustrating it as it would appear in use;

Fig. 2 is a longitudinal section therethrough, taken on the line 2—2, Fig. 3; and Fig. 3 is a cross-section therethrough, taken on the line 3—3, Fig. 2.

Fig. 4 is a cross section taken on the line 4—4 of Fig. 3.

In the drawing, a tow car is indicated at 10, with its rear bumper at 11, and a trailer is indicated at 12, with its tongue at 13. The tongue 13 is provided with any of the standard ball coupling sockets 14.

The improved dolly is supported on two wheels 15 joined by means of an axle 16. The main frame of the dolly consists of a single cross frame beam 17, preferably formed from a channel iron with its concave face turned downwardly. The lower face of the channel is closed by means of bottom plates 18 welded between the side flanges of the channel iron 17, thus forming a relatively flat, elongated beam.

The beam is supported by means of two sets of leaf springs 19. The springs 19 are secured beneath each extremity of the beam 17 by means of spring-clamping bolts 20, and extend first forwardly beneath the beam, thence curved downwardly and rearwardly at an angle of substantially 30°, terminating in spring shackles 21, by means of which they are secured to the axle 16 adjacent the wheels 15.

A trailer plate 22 is secured across the midportion of the beam 17 by means of suitable clamping bolts 23. The plate 22 terminates at its rear in any of the conventional trailer coupling balls 24. The plate 22 is provided with a plurality of spaced-apart bolt-receiving holes 25 into which the bolts 23 may be positioned to vary the forward and back position of the ball 24.

The ball 24 is designed to receive the ball socket 14 of the trailer tongue 13. The bolts 23 also secure a tow car plate 26 in place across the bottom of the beam 17 and below the plate 22. The tow car plate terminates at its forward extremity in a second ball socket 27. The tow car plate is also provided with an aligned series of spaced-apart bolt holes 28, which allow the forward and back position of the ball socket 27 to be adjusted and varied.

The ball socket 27 is designed to engage a towing ball 29 positioned on a draw bar 30 which may be attached to the tow car 10 in any desired manner, such as by means of clamping plates 31 and clamping bolts 32, which clamp and secure the draw bar 30 to the tow car bumper 11.

The extremities of the beam 17 are notched to receive elongated square spring tubes 33, which are welded or otherwise secured in place therein and which extend forwardly therefrom in parallel relation.

Each spring tube 33 is provided with a sliding plunger 34 projecting forwardly from the forward extremity of the spring tube. Each plunger terminates in a vertical T-head 35. The plungers 34 are constantly urged forwardly in the tubes 33 by means of compression springs 36. The plungers 34 are prevented from being forced completely from the tubes 33 by means of retaining pins 37 which extend through longitudinally extending pin slots 38 in the plungers.

The amount of projection of the plungers and the compression in the springs 36 can be adjusted by means of spring-adjusting screws 39, which are threaded through the rear extremities of the tubes 33 and terminate in operating handles 40. Rotation of the screws 39 forces a spring button 41 against the rear extremities of the springs 36 to force the plunger 34 forwardly.

The T-heads 35 are designed to bear against the bumper 11 at each side of the tow ball 29, and are maintained in resilient contact with the bumper by means of the expansion springs 36. The T-heads are preferably formed from bent rods welded to the extremities of the plungers 34. The bent rods are covered by means of a rubber hose or tubing 42, as shown in Fig. 4, to cushion the contact with the bumper 11.

The position of the plate 26 and the spring screws 39 are adjusted relatively to each other to position the T-heads 35 snugly against the bumper 11 when the springs 36 are compressed substantially one-half their length. The plate 22 is adjusted to position the weight of the trailer at the best riding point on the dolly, and the device is ready for use.

Any attempts on the part of the trailer or trailer dolly to sway or sideswipe are resisted by the springs 36, since the latter are compressed in consequence of the varying positions of the bumper 11. Therefore, the trailer dolly is resiliently maintained in the proper travel path.

Should the tow car turn to the left, the spring in the left spring tube 33 will be compressed, and the spring in the right spring tube will be extended, allowing relative movement between the tow car and dolly. Movement, however, is resisted by the left spring 36 so that the dolly will be eventually forced back to its aligned travel position.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A trailer dolly for attachment to the bumper of a tow car comprising: an axle; a ground-engaging wheel at each extremity of said axle; leaf springs extending upwardly and forwardly from the extremities of said axle; a transverse beam secured at its extremities to said springs and extending therebetween forwardly of and above said axle; a trailer plate mounted on the top of said beam at the middle thereof and extending rearwardly therefrom; a trailer coupling ball on said plate; a tow car plate secured below said beam and below said trailer plate and extending forwardly therefrom; a ball socket mounted on the forward extremity of said tow car plate; a spring tube mounted on and extending forwardly from each extremity of said beam; a compression spring in each spring tube; a plunger projecting forwardly from each spring tube and bearing against one of said springs; a vertically extending T-head on the forward extremity of each plunger and a spring-adjusting screw threaded through the rear extremity of each of said tubes for moving said spring forwardly to bring said T-head into contact with the bumper of the tow car.

GEORGE E. PRUITT.

REFERENCES CITED

The following references are of record in the file of this patent:

UNITED STATES PATENTS

| Number | Name | Date |
|---|---|---|
| 1,576,975 | Hutchison | Mar. 16, 1926 |
| 1,807,243 | Kayler | May 26, 1931 |
| 2,344,921 | McDaniel | Mar. 21, 1944 |
| 2,378,297 | Hetzler | June 12, 1945 |

FOREIGN PATENTS

| Number | Country | Date |
|---|---|---|
| 443,769 | Germany | May 6, 1927 |